United States Patent
Lee et al.

(10) Patent No.: US 10,096,842 B2
(45) Date of Patent: Oct. 9, 2018

(54) VANADIUM SOLUTION, ELECTROLYTE COMPRISING SAME, SECONDARY BATTERY COMPRISING SAME, AND METHOD FOR PREPARING SAME

(71) Applicant: LG CHEM, LTD., Seoul (KR)

(72) Inventors: Jeongbae Lee, Daejeon (KR); Tae Geun Noh, Daejeon (KR); Bong Hyun Jeong, Daejeon (KR); Geungi Min, Daejeon (KR); Sikwon Moon, Daejeon (KR); Sujin Byun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 122 days.

(21) Appl. No.: 15/316,096

(22) PCT Filed: Jun. 12, 2015

(86) PCT No.: PCT/KR2015/005970
§ 371 (c)(1),
(2) Date: Dec. 2, 2016

(87) PCT Pub. No.: WO2015/190889
PCT Pub. Date: Dec. 17, 2015

(65) Prior Publication Data
US 2017/0110738 A1    Apr. 20, 2017

(30) Foreign Application Priority Data
Jun. 13, 2014    (KR) .................. 10-2014-0072460

(51) Int. Cl.
| | |
|---|---|
| *H01M 8/18* | (2006.01) |
| *H01M 8/20* | (2006.01) |
| *H01M 8/02* | (2016.01) |

(52) U.S. Cl.
CPC .............. *H01M 8/02* (2013.01); *H01M 8/18* (2013.01); *H01M 8/188* (2013.01); *H01M 8/20* (2013.01)

(58) Field of Classification Search
None
See application file for complete search history.

(56) References Cited

U.S. PATENT DOCUMENTS

| | | | | |
|---|---|---|---|---|
| 5,250,158 A | * | 10/1993 | Kaneko .................. | C01G 31/00 205/538 |
| 2006/0147774 A1 | | 7/2006 | Suzuki et al. | |
| 2010/0173184 A1 | * | 7/2010 | Shiozaki ................ | C01G 31/00 429/94 |

(Continued)

FOREIGN PATENT DOCUMENTS

| | | |
|---|---|---|
| CN | 102244285 A | 11/2011 |
| DE | 41 34 109 A1 | 4/1992 |

(Continued)

OTHER PUBLICATIONS

International Search Report for PCT/KR2015/005970 (PCT/ISA/210) dated Aug. 7, 2015.

(Continued)

*Primary Examiner* — Scott J. Chmielecki
(74) *Attorney, Agent, or Firm* — Birch, Stewart, Kolasch & Birch, LLP

(57) ABSTRACT

The present specification relates to a vanadium solution, an electrolyte including the same, a secondary battery including the same, and a method for preparing the same.

18 Claims, 5 Drawing Sheets

(56) References Cited

U.S. PATENT DOCUMENTS

2013/0095362 A1* 4/2013 Keshavarz ............ H01M 8/188
                                                                                   429/105

FOREIGN PATENT DOCUMENTS

| EP | 0 566 019 A1 | 10/1993 |
|---|---|---|
| JP | 5-303973 A | 11/1993 |
| JP | 8-64223 A | 3/1996 |
| JP | 2994210 B2 | 10/1999 |
| JP | 2003-157882 A | 5/2003 |
| JP | 2004-207177 A | 7/2004 |
| JP | 2007-188729 A | 7/2007 |
| KR | 10-2009-0082104 A | 7/2009 |
| KR | 10-2011-0064058 A | 6/2011 |
| KR | 10-2014-0017191 A | 2/2014 |
| KR | 10-2014-0026265 A | 3/2014 |

OTHER PUBLICATIONS

European Search Report for Appl. No. 15805901.4 dated Dec. 20, 2017.

* cited by examiner

[Figure 1]
[Figure 2]

[Figure 3]
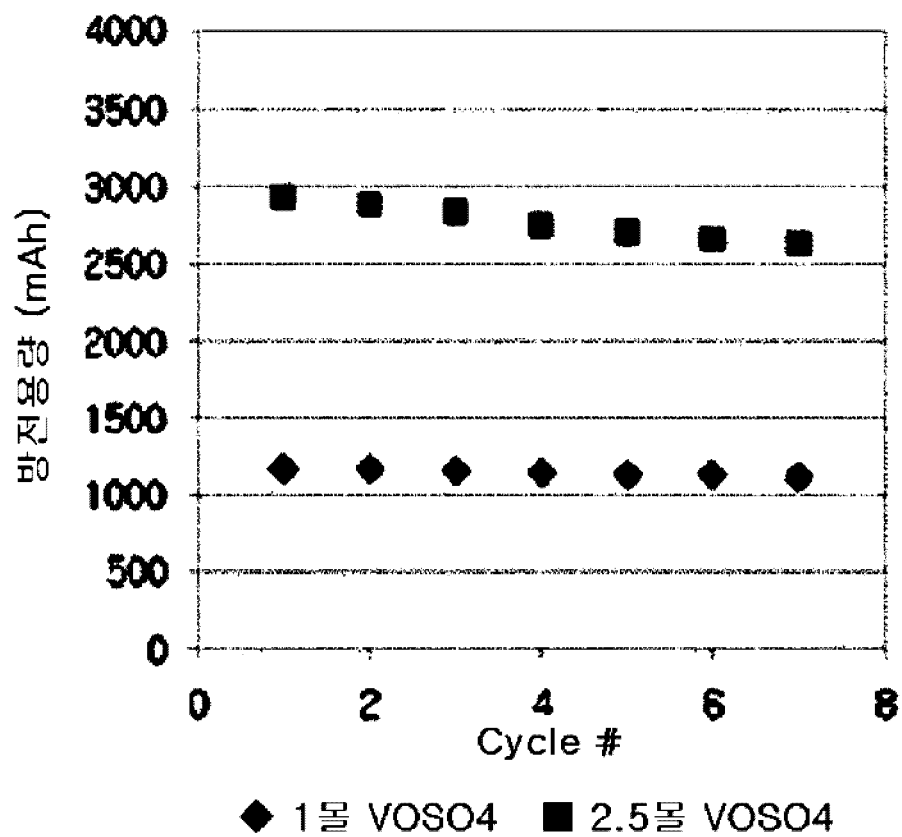

[Figure 4]
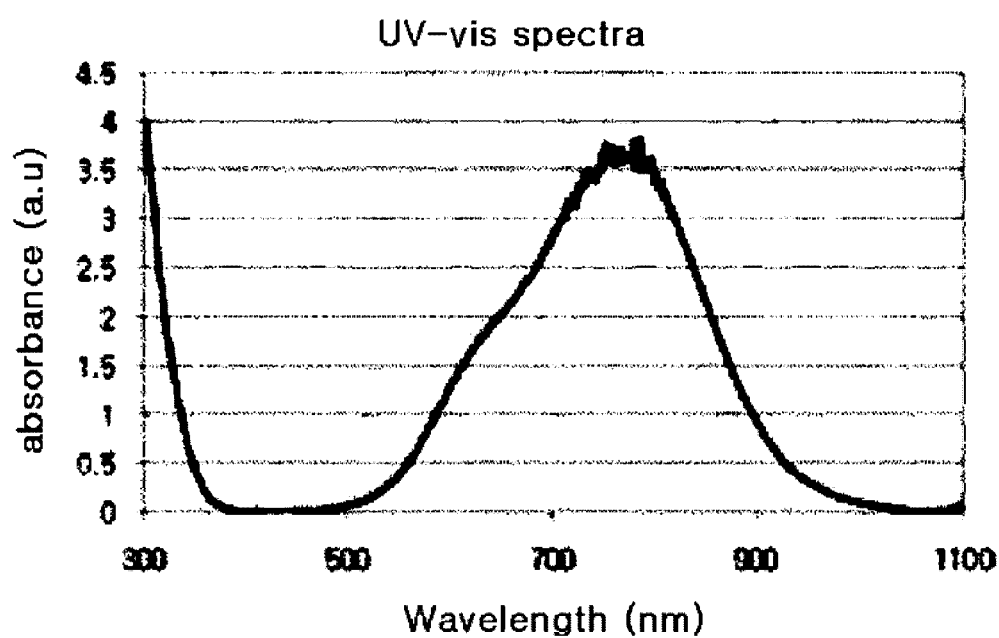

[Figure 5]
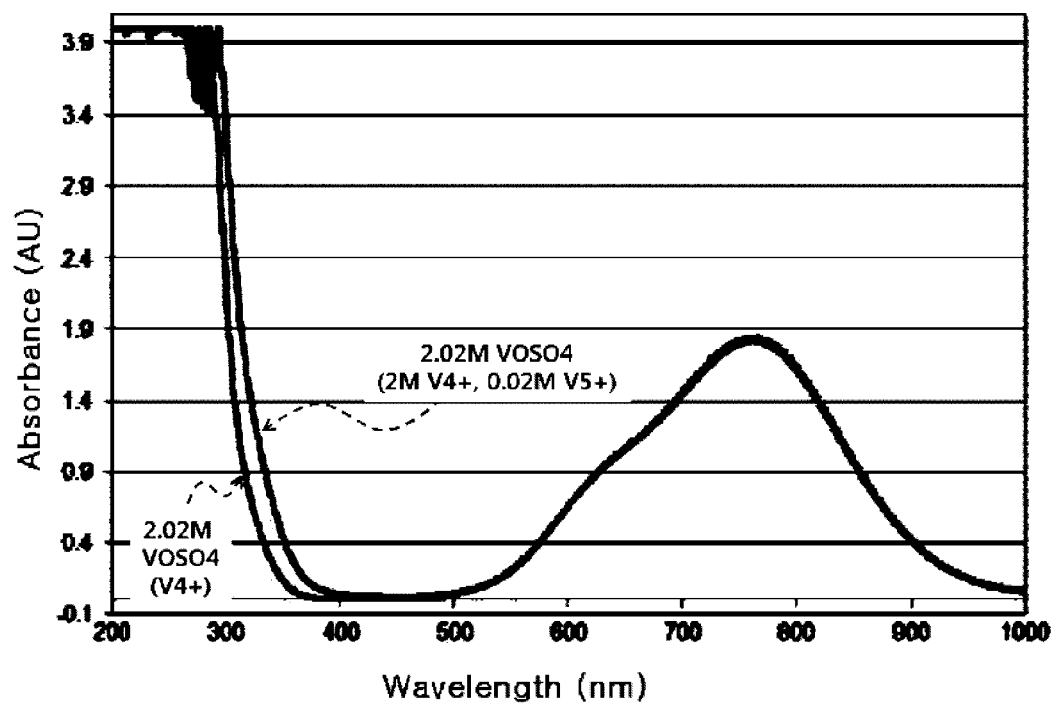

[Figure 6]
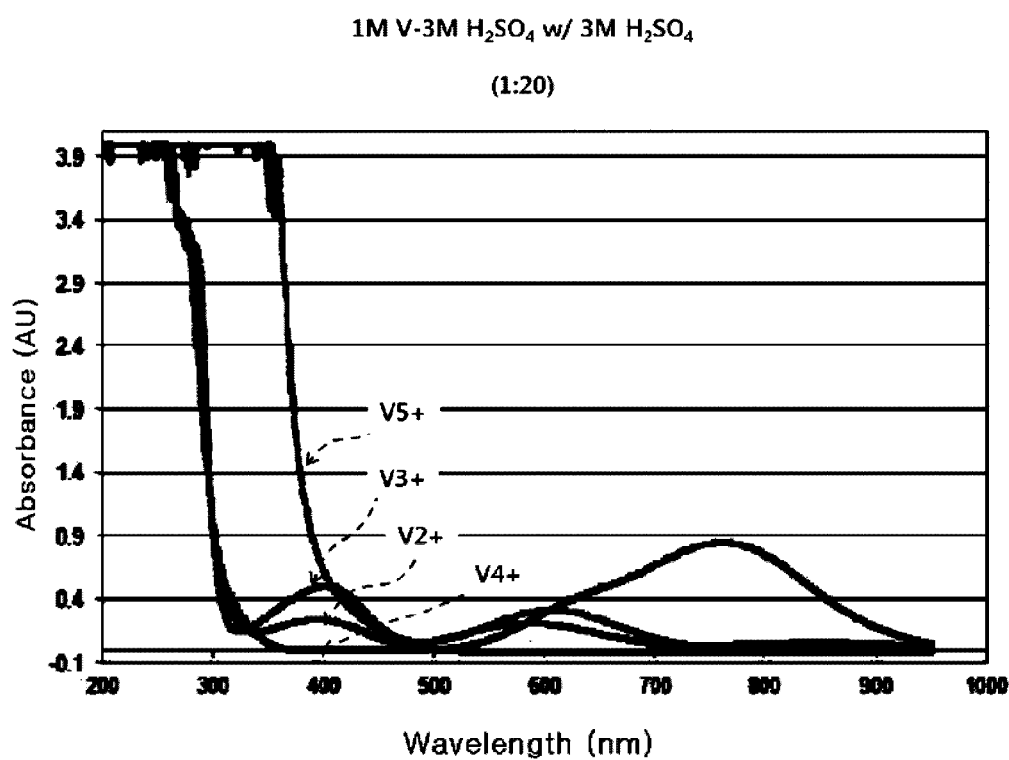

US 10,096,842 B2

VANADIUM SOLUTION, ELECTROLYTE COMPRISING SAME, SECONDARY BATTERY COMPRISING SAME, AND METHOD FOR PREPARING SAME

TECHNICAL FIELD

This application claims priority to and the benefit of Korean Patent Application No. 10-2014-0072460 filed in the Korean Intellectual Property Office on Jun. 13, 2014, the entire contents of which are incorporated herein by reference.

The present specification relates to a vanadium solution, an electrolyte including the same, a secondary battery including the same, and a method for preparing the same.

BACKGROUND ART

Vanadium redox flow batteries (V-RFB) are a representative flow battery, and a secondary battery in which vanadium is used as a positive electrode and negative electrode electrolyte and the charge/discharge occurs due to the oxidation and reduction reactions of the electrolyte. The biggest difference from general batteries is that the charge/discharge occurs while circulating the electrolyte where energy is stored. The charge/discharge occurs in a stack where the electrochemical reactions of oxidation and reduction occur, and electricity is stored in an electrolyte kept in a separate tank.

Therefore, the vanadium redox flow battery (V-RFB) has advantages such as capacity enlargement, economic efficiency, and stability, and thus has been highlighted as a next-generation energy storage device. In order to increase the energy density (kW/L) of the electrolyte, it is essential to develop a high concentration of vanadium electrolyte, but there is a problem in that vanadium precursors exhibit low solubility in an aqueous sulfuric acid solution.

The existing general vanadium electrolyte is prepared by a process in which sulfuric acid is introduced into distilled water to prepare a 2 to 3 M aqueous sulfuric acid solution, and a vanadium precursor is introduced into the prepared aqueous sulfuric acid solution.

This process is known as a method used in the dissolution of usually a less than 1.5 M vanadium precursor when considering the stability against precipitation.

In the preparation of the vanadium electrolyte, there are disadvantages in that a vanadium ion in the vanadium electrolyte may combine with oxygen to form a complex compound due to dissolved oxygen that is dissolved in distilled water, and when the concentration of the aqueous sulfuric acid solution is 3 M or more, the solubility of the vanadium precursor is reduced.

Recently, studies have been continuously conducted on the development of a high concentration of a vanadium electrolyte, but most of the studies have been limited to studies in which carboxylic acid, EDTA, a metal salt, an ammonium salt, glycerin, and alcohols are introduced as an additive to suppress the precipitation of vanadium salts, increase the dispersion stability, or develop an electrolytic method having a complicated process.

In the case of a method which uses an additive, through the interaction of the additive with the vanadium ion, the solubility of a vanadium precursor may be increased and the precipitation rate and the precipitation reaction may be suppressed, but there is a problem in that in the battery reaction, the oxidation and reduction reversible reaction rate of the vanadium ion is reduced, and there is a disadvantage in that at the battery operating voltage, the additive may be electrolyzed to cause a drop in battery voltage and a decrease in capacity or generate gases such as carbon dioxide and hydrogen gases.

DETAILED DESCRIPTION OF THE INVENTION

Technical Problem

The present specification has been made in an effort to provide a vanadium solution, an electrolyte including the same, a secondary battery including the same, and a method for preparing the same.

Technical Solution

An exemplary embodiment of the present specification provides a method for preparing a vanadium solution, the method including:

preparing a vanadium solution including a pentavalent vanadium ion ($VO_2^+$), an acid, and deoxygenated distilled water; and dissolving a vanadium precursor capable of forming a tetravalent vanadium ion ($VO^{2+}$) in the vanadium solution.

As the preparing of the vanadium solution including the pentavalent vanadium ion, the acid, and the deoxygenated distilled water, a first exemplary embodiment includes:

dissolving a vanadium precursor capable of forming a tetravalent vanadium ion in distilled water in deoxygenated distilled water;

mixing the distilled water in which the vanadium precursor is dissolved with the acid to prepare a vanadium solution; and oxidizing a tetravalent vanadium ion in the vanadium solution into a pentavalent vanadium ion.

As the preparing of the vanadium solution including the pentavalent vanadium ion, the acid, and the deoxygenated distilled water, a secondary exemplary embodiment includes dissolving a vanadium precursor capable of forming a pentavalent vanadium ion in deoxygenated distilled water, an acid, or a mixture thereof. In this case, after the vanadium precursor capable of forming the pentavalent vanadium ion is introduced into the deoxygenated distilled water, a process of mixing the resulting mixture with the acid may additionally carried out. Further, after the vanadium precursor capable of forming the pentavalent vanadium ion is introduced into the acid, a process of mixing the resulting mixture with the deoxygenated distilled water may additionally carried out.

Another exemplary embodiment of the present specification provides a vanadium solution including a vanadium component which includes a tetravalent vanadium ion, deoxygenated distilled water, and an acid, in which the vanadium component includes a pentavalent vanadium ion in a state where the vanadium solution is not used in a charge or discharge using electrodes.

Still another exemplary embodiment of the present specification provides a vanadium solution including a vanadium component which includes a tetravalent vanadium ion, deoxygenated distilled water, and an acid, in which the vanadium solution includes vanadium at a concentration of 1.5 to 3.5 M, and when the vanadium solution is left to stand at 5° C. for 100 hours in a state where the acid in the vanadium solution has a concentration of 3 M, a molar percentage of the vanadium ion dissolved in the vanadium solution based on the content of vanadium in the entire vanadium solution is more than 95%.

Further, yet another exemplary embodiment of the present specification provides an electrolyte including the vanadium solution according to the above-described exemplary embodiments.

In addition, still yet another exemplary embodiment of the present specification provides a secondary battery including the electrolyte according to the above-described exemplary embodiments.

Advantageous Effects

According to several exemplary embodiments of the present specification, it is possible to maintain the tetravalent vanadium ion at a high concentration in the vanadium solution, and prevent the precipitation of vanadium. A battery having excellent efficiency and stability may be provided by using the vanadium solution in an electrolyte of a secondary battery.

DESCRIPTION OF DRAWINGS

FIG. 1 illustrates a vanadium solution prepared by Example 1 according to an exemplary embodiment of the present specification.

FIG. 2 illustrates a vanadium solution prepared by Comparative Example 1 according to an exemplary embodiment of the present specification.

FIG. 3 is a graph illustrating a discharge capacity according to the concentration of a vanadium precursor dissolved in an aqueous acid solution in the vanadium solutions prepared by Example 1 and Comparative Example 2 according to an exemplary embodiment of the present specification.

FIG. 4 is a spectrophotometric graph of a vanadium solution prepared by the Example according to an exemplary embodiment of the present specification.

FIG. 5 illustrates an absorption wavelength graph by the UV-Vis. measurement of Example 2 and Comparative Example 3 according to an exemplary embodiment of the present specification.

FIG. 6 illustrates the absorption wavelength according to the degree of oxidation of a vanadium ion.

BEST MODE

Hereinafter, the present invention will be described in more detail.

An exemplary embodiment of the present specification relates to a method for preparing a vanadium solution, the method including:

preparing a vanadium solution including a pentavalent vanadium ion ($VO_2^+$), an acid, and deoxygenated distilled water; and dissolving a vanadium precursor capable of forming a tetravalent vanadium ion ($VO^{2+}$) in the vanadium solution.

According to the exemplary embodiment, it is possible to provide a vanadium solution including a high concentration of a tetravalent vanadium ion without any precipitate by using a method of preparing a vanadium solution including a pentavalent vanadium ion, and then dissolving the tetravalent vanadium ion therein.

In the exemplary embodiment, deoxygenated distilled water is used. The dissolved oxygen in distilled water may combine with the vanadium ion to form a complex compound. In the exemplary embodiment, it is possible to suppress the precipitate of the electrolyte from being produced and prevent a decrease in capacity of a battery by using deoxygenated distilled water from which dissolved oxygen has been removed.

According to another exemplary embodiment of the present specification, by using the deoxygenated distilled water as described above, the concentration of oxygen in a vanadium solution to be finally prepared may be 0.1 ppm to 5 ppm, and the concentration of oxygen in the vanadium solution may also be 0.1 ppm to 1 ppm.

The vanadium precursor capable of forming the tetravalent vanadium ion forms a tetravalent vanadium ion when being dissolved in distilled water, and for example, $VOSO_4$ may be used.

The vanadium precursor may have an oxidation state such as V(II), V(III), $VO^{2+}$(IV), and $VO_2^+$(V) in an aqueous solution. Examples of a generally used vanadium precursor include $VCl_3$, $V_2O_5$, $VOSO_4$, and the like, but a solution composed of an aqueous solution of $VCl_3.HCl$ has a problem in that a chlorine gas is generated, and when $V_2O_5$ is directly dissolved in distilled water, there is a disadvantage in that the solubility is low.

In the above-described exemplary embodiment, the concentration of the pentavalent vanadium ion in the vanadium solution including the pentavalent vanadium ion, the acid, and the deoxygenated distilled water may be 0.01 M to 2 M. For example, the concentration of the pentavalent vanadium ion in the vanadium solution is 0.2 M or less. When the concentration of the pentavalent vanadium ion in the vanadium solution including the pentavalent vanadium ion is 0.2 M or less, even though another species ion is incorporated, it is possible to prevent an excessive change in the electronic oxidation state of the ion due to the self-redox oxidation reduction reaction among the ions.

As the acid used in the above-described exemplary embodiment, an acid used in the art may be applied, and for example, it is possible to use one or more selected from sulfuric acid, nitric acid, hydrochloric acid, formic acid, acetic acid, and the like alone or a mixed acid thereof.

According to an exemplary embodiment, the concentration of the acid in the vanadium solution including the pentavalent vanadium ion, the acid, and the deoxygenated distilled water may be 0.5 M to 7 M, and specifically 3 M to 5 M. The concentration of the acid in the finally prepared vanadium solution may also be 0.5 M to 7 M, and specifically 3 M to 5 M.

According to an exemplary embodiment, the above-described method for preparing a vanadium solution may further include flowing an inert gas into distilled water to prepare deoxygenated distilled water. As the inert gas, an inert gas known in the art may be used. Examples thereof include nitrogen, helium, neon, argon, and the like, but are not limited thereto.

According to an exemplary embodiment, before, while, or after a vanadium precursor capable of forming a tetravalent vanadium ion ($VO^{2+}$) is dissolved in the vanadium solution, a step of heating the vanadium solution at 80° C. or more may be further carried out. The heating step may include a reflux. The heating temperature in the heating step is suitably in a range which may suppress a phenomenon in which the concentration equilibrium of the solution collapses, and may be up to a temperature of 100° C. or more, but is preferably 80° C., in consideration of the difference in boiling points between the acid and water. Further, the heating step may be carried out simultaneously with introducing an inert gas, and in this case, it is possible to effectively remove dissolved oxygen which may combine with the vanadium ion in the solution to form a complex compound.

According to an exemplary embodiment (first exemplary embodiment) of the present specification, the preparing of the vanadium solution including the pentavalent vanadium ion, the acid, and the deoxygenated distilled water includes:

dissolving a vanadium precursor capable of forming a tetravalent vanadium ion in distilled water in deoxygenated distilled water;

mixing the distilled water in which the vanadium precursor is dissolved with the acid to prepare a vanadium solution; and oxidizing the tetravalent vanadium ion in the vanadium solution into a pentavalent vanadium ion.

The vanadium precursor capable of forming the tetravalent vanadium ion, which is used in the first exemplary embodiment forms the tetravalent vanadium ion when being dissolved, and for example, $VOSO_4$ may be used.

In the first exemplary embodiment, before, while, or after the vanadium precursor is dissolved in the deoxygenated dissolved water, the heating step at 80° C. or more may be carried out. The explanation on the heating step is the same as that described above. The heating step may be carried out simultaneously with introducing an inert gas, and in this case, it is possible to effectively remove dissolved oxygen which may combine with the vanadium ion in the solution to form a complex compound.

The first exemplary embodiment may further include preparing deoxygenated distilled water before dissolving the vanadium precursor in the deoxygenated distilled water.

In the first exemplary embodiment, the oxidizing of the tetravalent vanadium ion into the pentavalent vanadium ion may use an electrochemical method.

According to an exemplary embodiment (second exemplary embodiment) of the present specification, the preparing of the vanadium solution including the pentavalent vanadium ion, the acid, and the deoxygenated distilled water includes dissolving a vanadium precursor capable of forming a pentavalent vanadium ion in deoxygenated distilled water, an acid, or a mixture thereof. In this case, after the vanadium precursor capable of forming the pentavalent vanadium ion is introduced into the deoxygenated distilled water, a process of mixing the resulting mixture with the acid may additionally carried out. Further, after the vanadium precursor capable of forming the pentavalent vanadium ion is introduced into the acid, a process of mixing the resulting mixture with the deoxygenated distilled water may additionally carried out. In this case, as the acid, an acid having a purity of 90% or more may be used. If necessary, a heating step at 80° C. or more may be carried out in order to dissolve the vanadium precursor capable of forming the pentavalent vanadium ion.

The second exemplary embodiment may further include, before or after the dissolving of the vanadium precursor capable of forming the pentavalent vanadium ion, preparing deoxygenated dissolved water before the mixing of the acid solution including the pentavalent vanadium ion with the deoxygenated distilled water.

In the second exemplary embodiment, as the vanadium precursor capable of forming the pentavalent vanadium ion in the acid, a vanadium precursor which is dissolved in an acid to form a pentavalent vanadium ion may be used, and for example, $V_2O_5$ may be used.

$V_2O_5$ becomes a pentavalent vanadium ion ($VO_2^+$) in the solution immediately after being dissolved, and the pentavalent vanadium ion ($VO_2^+$) may accept a negative ion from the vanadium precursor additionally dissolved and the solvent to suppress production of an oxide such as $V_2O_3$, $V_2O_4$, and $V_2O_5$. When $V_2O_5$ is used, the pentavalent vanadium ion is immediately formed, and as a result, an additional process of changing the oxidation number is not necessary.

The concentration of the vanadium ion in the vanadium solution prepared according to the above-described exemplary embodiments may be 0.5 M or more, for example, 1 M to 3.5 M, and specifically 1.5 M to 3.5 M. More specifically, the concentration of the vanadium ion in the vanadium solution prepared according to the above-described exemplary embodiments may be 1 M to 3 M, for example, 1.5 M to 2.6 M. In particular, even when the vanadium solution has a high vanadium ion concentration of 1.5 M or more, and more preferably more than 2 M, the vanadium solution may exhibit the stability without any precipitate.

Another exemplary embodiment of the present specification provides a vanadium solution including a vanadium component which includes a tetravalent vanadium ion, deoxygenated distilled water, and an acid, in which the vanadium component includes a pentavalent vanadium ion in a state where the vanadium solution is not used in a charge or discharge using electrodes. Here, the vanadium component is not limited as long as the vanadium component includes vanadium. For example, a case where vanadium is included when the oxidation number of vanadium is changed or even in the case of forming a complex with another material is included in the vanadium component.

In the exemplary embodiment, the expression 'a state where ~ is not used in a charge or discharge using electrodes' means the state before the vanadium solution is introduced into a battery, or the state before an electrochemical reaction for the charge or discharge occurs even after the vanadium solution is introduced into a battery.

In the exemplary embodiment, the vanadium solution includes the pentavalent vanadium ion together with the tetravalent vanadium ion. This is a result of using a method of dissolving the tetravalent vanadium ion in the vanadium solution including the pentavalent vanadium ion according to the above-described exemplary embodiments. The presence and absence of the pentavalent vanadium ion can be confirmed by using the method known in the art. For example, the presence and absence of the pentavalent vanadium ion may be confirmed through the color of the solution, the absorption wavelength by the UV-Vis. measurement, and the open circuit voltage (OCV).

In order to confirm the presence and absence of the pentavalent vanadium ion as described above, it is possible to prepare a reference solution having a vanadium concentration which is the same as that of the vanadium solution desired to be confirmed, but having only the tetravalent vanadium ion without having the pentavalent vanadium ion. In order to make the concentration of vanadium in the vanadium solution desired to be confirmed the same as the concentration of vanadium in a vanadium solution of a reference solution, if necessary, the vanadium solution desired to be confirmed may be diluted. In this case, distilled water may be used for dilution.

For example, the reference solution may be prepared as follows.

First, the concentration of a vanadium ion dissolved in a vanadium solution desired to be confirmed is measured. In this case, the concentration of the vanadium ion may be measured by taking a portion of the vanadium solution, and using an inductively coupled plasma (ICP) method. $VOSO_4$, in the form of a trihydrate in an amount which may impart a tetravalent vanadium ion at a concentration which is the same as the measured concentration of the vanadium ion, is introduced into 0.65 liter of a tertiary distilled water, and a magnetic stirrer agitation is performed for 30 minutes. The $VOSO_4$ has a purity of 71.94% based on $VOSO_4$. Subsequently, $H_2SO_4$ having a purity of 96.5% in an amount, which may impart a concentration of about 3 M, is slowly introduced while maintaining the magnetic stirrer agitation. Subsequently, the tertiary distilled water is introduced to adjust the volume of the solution to be 1 L. An aqueous vanadium sulfuric acid solution may be completely dissolved within 30 minutes, but since the temperature of the solution may be increased to a 60° C. level during the preparation process, the agitation may be maintained until the temperature reaches a final normal temperature level, and then the magnetic stirrer may be removed, and a decrease in volume due to the cooling of the solution to the normal temperature level may be once again corrected with a tertiary distilled water to prepare a reference solution.

When the reference solution is prepared by the aforementioned method, in the case where it is difficult to dissolve a vanadium ion at a concentration which is the same as the concentration of the vanadium ion dissolved in a vanadium solution desired to be confirmed, it is possible to dilute the vanadium solution desired to be confirmed so as to be suitable for the concentration of the vanadium ion of the reference solution. During the dilution, distilled water may be used.

As an example, as a method of confirming the color of the solution, the vanadium solution displays a blue color when including only a tetravalent vanadium ion (reference solution), but the vanadium solution displays a blackish blue color when including only a pentavalent vanadium ion. The method of confirming the color of the solution may obtain a more certain result by preparing the above-described reference solution and comparing the two solutions, but the color of the solution displays a clear blue color when only a tetravalent vanadium ion is present largely regardless of the concentration of acid or the concentration of vanadium, whereas when a pentavalent vanadium ion is present, the color of the solution displays a blackish blue color, and as a result, even when the reference solution is not prepared, or solutions having different concentrations of the vanadium ion are compared with each other, the presence of the pentavalent vanadium ion may be confirmed.

As another example, when the absorption wavelength by the UV-VIS. measurement is measured, in the vanadium solution including the pentavalent vanadium ion compared to the vanadium solution (reference solution) including only the tetravalent vanadium ion, the absorption wavelength exhibited in at least a portion of 250 nm to 450 nm, and in at least a portion of 280 nm to 380 nm according to an example is shifted to a long wavelength. According to an example, in the vanadium solution including the pentavalent vanadium ion compared to the vanadium solution (reference solution) including only the tetravalent vanadium ion, the absorption wavelength may be shifted to a long wavelength of 5 nm or more, for example, 10 nm or more at an absorbance intensity of 1.4. According to another example, in the vanadium solution including the pentavalent vanadium ion compared to the vanadium solution (reference solution) including only the tetravalent vanadium ion, the absorption wavelength may be shifted to a long wavelength of 10 nm or more, for example, 15 nm or more at an absorbance intensity of 0.1.

As another example, when an open circuit voltage (OCV) is measured, in the vanadium solution including the pentavalent vanadium ion compared to the vanadium solution (reference solution) including only the tetravalent vanadium ion, the OCV tends to be increased. According to an example, in the vanadium solution including the pentavalent vanadium ion compared to the vanadium solution (reference solution) including only the tetravalent vanadium ion, the OCV may be increased by 0.05 V or more, for example, 0.1 V or more.

According to an exemplary embodiment, the concentration of the pentavalent vanadium ion in the vanadium solution may include 0.01 M to 2 M, and 0.2 M or less is preferred.

Another exemplary embodiment of the present specification provides a vanadium solution including a vanadium component which includes a tetravalent vanadium ion, deoxygenated distilled water, and an acid, in which the vanadium solution includes vanadium at a concentration of 1.5 to 3.5 M, and when the vanadium solution is left to stand at 5° C. for 100 hours in a state where a hydrogen atom or sulfuric acid in the vanadium solution has a concentration of 6 M or 3 M, respectively, a molar percentage of the vanadium ion dissolved in the vanadium solution based on the content of vanadium in the entire vanadium solution is more than 95%. Here, the meaning of the vanadium component is the same as that described above.

In general, in an acid solution including a tetravalent vanadium ion, the precipitate is relatively fast formed at a low temperature such as 5° C. or less. Particularly at a vanadium concentration of 1.5 M or more based on a sulfuric acid concentration of 3 M, it is known that the precipitation rate is fast. However, according to the above-described exemplary embodiment, most of the vanadium is not precipitated at a low temperature of 5° C. even at a vanadium concentration of 1.5 M or more.

In the exemplary embodiment, even though vanadium is included at a high concentration of 1.5 M to 3.5 M, most of the vanadium is present in a state of ion being dissolved in the solution without being precipitated. Since the precipitation of vanadium may be affected by the concentration of acid or the temperature, in the exemplary embodiment, the concentration condition of the acid is limited to a concentration of 6 M in the hydrogen atom or a concentration of 3 M in sulfuric acid, and the temperature condition is limited to 5° C. When an acid other than sulfuric acid is used, the concentration of the hydrogen atom may be used in order to measure the concentration of the acid.

According to an exemplary embodiment, the vanadium solution includes vanadium at a concentration of 2 M to 3.5 M.

According to an exemplary embodiment, the vanadium solution includes vanadium at a concentration of 1.5 to 3.5 M, and when the vanadium solution is left to stand at 5° C. for 100 hours in a state where a hydrogen atom or sulfuric acid in the vanadium solution has a concentration of 6 M or 3 M, respectively, a molar percentage of the vanadium ion dissolved in the vanadium solution based on the content of vanadium in the entire vanadium solution is 96% or more, preferably 97% or more, and more preferably 98% or more.

An exemplary embodiment of the present specification provides an electrolyte including the vanadium solution according to the above-described exemplary embodiment.

An exemplary embodiment of the present specification provides a secondary battery including a positive electrode, a negative electrode, and the electrolyte including the vanadium solution according to the above-described exemplary embodiment provided between the positive electrode and the negative electrode.

A secondary battery using the vanadium solution as the electrolyte may improve the capacity of the battery without increasing a volume of a storage container of the electrolyte, and the electrolyte may prevent side effects such as an increase in flow resistance of the electrolyte by securing the stability against precipitation.

Further, in the related art, carboxylic acid, EDTA, a metal salt, an ammonium salt, alcohols, glycerin, and the like are additionally introduced in a predetermined amount into the electrolyte and used as an additive or a precipitation inhibitor, but these stabilizers may have a side reaction which produces gases in a solution of a pentavalent vanadium ion ($VO_2^+$), and have a side effect which suppresses reduction properties of the pentavalent vanadium ion ($VO_2^+$), and the like. However, the vanadium electrolyte according to the present specification produces no side reaction of the vanadium ion because the stabilizer is not used, may secure stability within a range of the existing battery operation voltage, and is also efficient in terms of prices because there are no process costs nor raw material costs, and the like generated by additionally introducing a stabilizer.

According to another exemplary embodiment of the present specification, as the secondary battery in the above-described exemplary embodiment, a secondary battery known in the art may be applied, and examples thereof include a vanadium redox flow battery, a lithium polymer battery, a lithium ion battery, a nickel hydrogen battery, a nickel cadmium battery, and the like, but are not limited thereto.

According to still another exemplary embodiment of the present specification, the secondary battery is a vanadium redox flow battery.

Hereinafter, preferred Examples for helping the understanding of the present specification will be suggested. However, the following Examples are provided for illustrating the present application, and the scope of the present specification is not limited thereby.

EXAMPLE 1

In a 3 M aqueous sulfuric acid solution in which 0.02 M of $VOSO_4$ was dissolved, a tetravalent vanadium ion ($VO^{2+}$) present in the solution was oxidized into a pentavalent vanadium ion ($VO_2^+$) through an electrochemical process, and then 2.5 M of $VOSO_4$ was dissolved therein. Moreover, the solution was stirred together with a reflux device while being heated to 80° C. for 30 minutes to prepare a 2.52 M vanadium solution, and the absorbance of the vanadium solution prepared by Example 1 was measured, and is illustrated as the following graph of FIG. 4.

The point observed in a wavelength region of 764 nm in FIG. 4 relates to a tetravalent vanadium ion ($VO^{2+}$), and the form of the vanadium ion in the vanadium solution is present mostly as a tetravalent ion, but FIG. 4 illustrates that a portion of the tetravalent vanadium ion ($VO^{2+}$) may be self-oxidized and reduced by 0.02 M of the pentavalent vanadium ion ($VO_2^+$) included in the solvent phase to be present in the form of a pentavalent vanadium ion ($VO_2^+$) at a wavelength of 390 nm or a pentavalent vanadium ion ($VO_2^+$) at a wavelength of 610 nm.

COMPARATIVE EXAMPLE 1

2.52 M of $VOSO_4$ was dissolved in a 3M aqueous sulfuric acid solution in which 0.02 M of $VOSO_4$ was dissolved. Moreover, the solution was stirred together with a reflux device while being heated to 80° C. for 30 minutes to prepare a vanadium solution.

COMPARATIVE EXAMPLE 2

Sulfuric acid was introduced into distilled water to prepare a 3 M aqueous sulfuric acid solution, and 1 M of the vanadium precursor $VOSO_4$ was dissolved in the prepared aqueous sulfuric acid solution to prepare a 1 M vanadium solution.

EXPERIMENTAL EXAMPLE 1

Evaluation of Precipitation of Vanadium Solution

In order to evaluate the precipitation of the vanadium solution prepared according to the present specification, the method as described below was used.

The vanadium solutions prepared in Example 1 and Comparative Example 1 were each left to stand at normal temperature.

As a result, in the vanadium solution prepared by Example 1, no precipitate was produced even after 45 days elapsed, but in the vanadium solution prepared by Comparative Example 1, a precipitate was produced even after 2 days elapsed, and FIGS. 1 and 2 illustrate the result of evaluating the precipitation.

Evaluation of Discharge Capacity of Vanadium Solution

In order to evaluate the discharge capacity of the vanadium solution prepared as described above, the method as described below was used.

A Nafion separation membrane was applied as an ion exchange membrane to a unit battery having an electrode size of 50×50 mm, and the vanadium electrolyte having a total volume of 75 cc prepared by Example 1 and Comparative Example 2 was circulated and supplied to the battery at a flow rate of 25 cc per minute.

The result of evaluating the discharge capacity is illustrated in the following FIG. 3.

As illustrated in FIG. 3, in the vanadium solution prepared by the Example, a synergistic effect of the discharge capacity by an increment in the concentration of the vanadium precursor in the vanadium solution prepared by Comparative Example 2 was observed.

COMPARATIVE EXAMPLE 3—Preparation of Reference Solution

Approximately 65% of a 1-liter volume flask was filled with a tertiary distilled water, and then a magnetic stirrer agitation was performed for 30 minutes by introducing 457.7 g of $VOSO_4$, which is equivalent to 2.02 M. In this case, the used vanadium precursor $VOSO_4$ was in the form of a trihydrate, and had a purity of 71.94% based on $VOSO_4$. Thereafter, 304.9 g of $H_2SO_4$ having a purity of 96.5%, which is equivalent to 3 M, was slowly introduced while maintaining the magnetic stirrer agitation. Thereafter, a volume which is insufficient for 1 liter was replenished with the tertiary distilled water, such that the volume of the solution became 1 liter. The agitation was maintained until the temperature reached the final normal temperature level, and then the magnetic bar was removed, and a decrease in volume due to the cooling of the solution to the normal temperature level was once again corrected with the tertiary distilled water to terminate the preparation process.

EXAMPLE 2

Approximately 65% of a 1-liter volume flask was filled with a tertiary distilled water, and then a magnetic stirrer agitation was performed for 30 minutes by introducing 1.83 g of $V_2O_5$, which is equivalent to 0.02 M. In this case, the used vanadium precursor $V_2SO_5$ had a purity of 99.5%. Thereafter, 304.9 g of $H_2SO_4$ having a purity of 96.5%, which is equivalent to 3 M, was slowly introduced while maintaining the magnetic stirrer agitation, and then an additional agitation was performed for 2 hours or more. Thereafter, 453.2 g of $VOSO_4$, which is equivalent to 2.0 M, was introduced to perform a magnetic stirrer agitation for 2 hours or more, such that $VOSO_4$ was completely dissolved. The correction work so as to make the volume of the solution become 1 liter was performed after the temperature of a final aqueous solution reached normal temperature, and then the magnetic bar was removed.

EXPERIMENTAL EXAMPLE 2

Confirmation of Precipitate and Color of Solution

The vanadium solution prepared in Example 2 displayed a blackish blue color, and was observed at 5° C. after 100 hours elapsed (A1) and after 240 hours elapsed (A2), but it was confirmed that no precipitate was generated (the molar percentage of a vanadium ion dissolved in a vanadium solution compared to the content of the entire vanadium solution was 100%). In contrast, the vanadium solution prepared in Comparative Example 3 displayed a blue color, and when the solution was observed at 5° C. after 20 hours elapsed (B1), it was observed that a precipitate seed had been formed (the molar percentage of the vanadium ion dissolved in the vanadium solution compared to the content of the entire vanadium solution was 95%), and a large amount of precipitate was generated when 240 hours elapsed (B2) (the molar percentage of the vanadium ion dissolved in the vanadium solution compared to the content of the entire vanadium solution was 75%).

UV-VIS. Absorption Analysis Method 0.5 ml of each of the solutions prepared in Comparative Example 3 and Example 2 was taken and mixed with 10 ml of a 3 M aqueous sulfuric acid solution to prepare a diluted solution, and an UV-Vis. absorption analysis was performed thereon. The base sample was a 3 M aqueous sulfuric acid solution, and then the two diluted solutions were subsequently analyzed in a wavelength range of 100 to 1,000 nm, and the result is illustrated in FIG. 5.

According to FIG. 5, in a solution of Example 2 including a pentavalent vanadium ion compared to a solution of Comparative Example 3 including a pure tetravalent vanadium ion, an absorption wavelength present at 280 to 380 nm was shifted to the right side. Specifically, according to FIG. 5, in Example 2 compared to the reference solution (Comparative Example 3), the wavelength was shifted to 14 nm (307 nm→321 nm) at an absorbance intensity of 1.4, and was shifted to 23 nm (353 nm→376 nm) at an absorbance intensity of 0.1.

For reference, the result of mixing 0.5 ml of a 1 M vanadium ion solution having a different oxidation number with a 3 M sulfuric acid, and measuring the UV-Vis. is illustrated in FIG. 6. In the case of the tetravalent vanadium ion, a main peak was formed in the vicinity of 780 nm. Unlike the other peaks, an absorption region for the pentavalent vanadium ion was observed at 200 to 450 nm. Due to characteristics of the absorption wavelength of the pentavalent vanadium ion as described above, it can be seen that the absorption wavelength was shifted to the right side compared to the case where the tetravalent vanadium ion is only included as described above. Four samples of divalent, trivalent, tetravalent, and pentavalent vanadium ions were prepared by the following method.

The initial aqueous vanadium solution was a solution produced by mixing $VOSO_4$ and sulfuric acid with distilled water, and in this case, the oxidation number of vanadium was tetravalent, the concentration of vanadium was 1 M, and the concentration of sulfuric acid was 3 M. Thereafter, a carbon felt was provided as an electrode in a unit battery having an active area of 5 cm×5 cm, a commercially available separation membrane was provided therein, 50 ml of the tetravalent electrolyte was circulated and supplied to both electrodes at a rate of 25 ml/min, respectively, and charge was performed at a current density of 50 mA/cm² by a constant current/constant voltage method until 1.4 V. When the injection current reached a 10% level of the initial current density in the constant voltage mode, the charge was terminated, and an absorption analysis was performed by taking a trivalent vanadium solution reduced at the negative electrode and a pentavalent solution oxidized at the positive electrode. Further, the preparations of the divalent vanadium solution were all the same as the method, but the volumes of the initial tetravalent electrolytes to be introduced into the unit battery were different from each other, and the charge voltage was 1.7 V. In other words, 50 ml of the tetravalent solution was circulated and supplied to the negative electrode, 100 ml of the tetravalent solution was circulated and supplied to the positive electrode, and charge was performed at a current density of 50 mA/cm² by a constant current/constant voltage method until 1.7 V. When the injection current reached a 10% level of the initial current density in the constant voltage mode, the charge was terminated, a divalent vanadium solution was taken from the negative electrode, and a pentavalent solution was taken from the positive electrode. However, the divalent solution at the negative electrode has very strong characteristics of being oxidized into a trivalent state when being exposed to the air, and as a result, the exposure to the air was minimized while supplying an inert gas, and even in the preparation of an UV-Vis. sample, a diluent solution was prepared immediately before the measurement, and the measurement was directly performed.

Measurement of OCV

Glassy carbon was applied to a working electrode, and Ag/AgCl was used in the reference. 20 ml of each of the solutions prepared in Comparative Example 3 and Example 2 was prepared, and then at normal temperature (23° C.) and in the state of a 13° C. solution and a 3° C. solution prepared due to the cooling by iced water, the OCV was measured. The measurement results are shown in the following Table 1.

TABLE 1

| Electrolyte temperature (° C.) | AVG voltage(V) For 300 sec | |
|---|---|---|
| | Comparative Example 3 | Example 2 |
| 3 | 0.7278 | 0.8544 |
| 13 | 0.7255 | 0.8554 |
| 23 | 0.7237 | 0.8591 |

As shown in Table 1, it could be confirmed that in a sample of Example 2 in which the pentavalent vanadium ion was mixed in an amount of approximately 1% with the tetravalent vanadium ion, the OCV was increased by approximately 0.13 V.

The invention claimed is:

1. A method for preparing a vanadium solution, the method comprising:
preparing a vanadium solution comprising a pentavalent vanadium ion ($VO_2^+$), an acid, and deoxygenated distilled water; and
dissolving a vanadium precursor capable of forming a tetravalent vanadium ion ($VO^{2+}$) in the vanadium solution.

2. The method of claim 1, wherein the preparing of the vanadium solution comprising the pentavalent vanadium ion, the acid, and the deoxygenated distilled water comprises:
dissolving a vanadium precursor capable of forming a tetravalent vanadium ion in distilled water in deoxygenated distilled water;
mixing the distilled water in which the vanadium precursor is dissolved with the acid to prepare a vanadium solution; and
oxidizing the tetravalent vanadium ion in the vanadium solution into the pentavalent vanadium ion.

3. The method of claim 1, wherein the preparing of the vanadium solution comprising the pentavalent vanadium ion, the acid, and the deoxygenated distilled water comprises dissolving a vanadium precursor capable of forming a pentavalent vanadium ion in deoxygenated distilled water, an acid, or a mixture thereof.

4. The method of claim 3, wherein the preparing of the vanadium solution comprising the pentavalent vanadium ion, the acid, and the deoxygenated distilled water comprises introducing a vanadium precursor capable of forming a pentavalent vanadium ion into deoxygenated distilled water, and then mixing the resulting mixture with the acid, or introducing a vanadium precursor capable of forming the pentavalent vanadium ion into the acid, and then mixing the resulting mixture with the deoxygenated distilled water.

5. The method of claim 1, wherein the vanadium precursor is $VOSO_4$.

6. The method of claim 1, further comprising:
flowing an inert gas into distilled water to prepare deoxygenated distilled water before the preparing of the vanadium solution comprising the pentavalent vanadium ion ($VO_2^+$), the acid, and the deoxygenated distilled water.

7. The method of claim 1, wherein a concentration of the pentavalent vanadium ion ($VO_2^+$) in the vanadium solution comprising the pentavalent vanadium ion ($VO_2^+$), the acid, and the deoxygenated distilled water is 0.01 M to 2 M.

8. The method of claim 1, wherein a concentration of the acid in the vanadium solution comprising the pentavalent vanadium ion ($VO_2^+$), the acid, and the deoxygenated distilled water is 0.5 M to 7 M.

9. The method of claim 1, further comprising:
heating the vanadium precursor at 80° C. or more before, while, or after the dissolving of the vanadium precursor.

10. The method of claim 3, wherein the vanadium precursor capable of forming the pentavalent vanadium ion is $V_2O_5$.

11. A vanadium solution comprising a vanadium component which comprises a tetravalent vanadium ion, deoxygenated distilled water, and an acid, wherein the vanadium component comprises a pentavalent vanadium ion in a state where the vanadium solution is not used in a charge or discharge using electrodes.

12. The vanadium solution of claim 11, wherein a concentration of oxygen in the vanadium solution is 0.1 ppm to 5 ppm.

13. The vanadium solution of claim 11, wherein the vanadium solution displays a blackish blue color compared to a reference solution which comprises a tetravalent vanadium ion having the same concentration as that of the vanadium solution and does not comprise the pentavalent vanadium ion, an absorption wavelength present in at least a portion of 250 to 450 nm is shifted to a long wavelength, or an OCV is increased.

14. A vanadium solution comprising a vanadium component which comprises a tetravalent vanadium ion, deoxygenated distilled water, and an acid, wherein the vanadium solution comprises vanadium at a concentration of 1.5 to 3.5 M, and when the vanadium solution is left to stand at 5° C. for 100 hours in a state where the acid in the vanadium solution is at a concentration of 3 M, a molar percentage of the vanadium ion dissolved in the vanadium solution based on a content of vanadium in the entire vanadium solution is more than 95%.

15. The vanadium solution of claim 14, wherein a concentration of oxygen in the vanadium solution is 0.1 ppm to 5 ppm.

16. An electrolyte comprising the vanadium solution of claim 11.

17. A secondary battery comprising a positive electrode, a negative electrode, and an electrolyte comprising the vanadium solution of claim 16 provided between the positive electrode and the negative electrode.

18. An electrolyte comprising the vanadium solution of claim 14.

* * * * *